United States Patent [19]

Atal et al.

[11] E Patent Number: Re. 32,580

[45] Reissued Date of Patent: Jan. 19, 1988

[54] DIGITAL SPEECH CODER

[75] Inventors: Bishnu S. Atal, New Providence; Joel R. Remde, Elizabeth, both of N.J.

[73] Assignee: American Telephone and Telegraph Company, AT&T Bell Laboratories, Murray Hill, N.J.

[21] Appl. No.: 909,319

[22] Filed: Sep. 18, 1986

Related U.S. Patent Documents

Reissue of:

[64] Patent No.: 4,472,832
Issued: Sep. 18, 1984
Appl. No.: 326,371
Filed: Dec. 1, 1981

[51] Int. Cl.[4] ..... G10L 5/00

[52] U.S. Cl. ..... 381/40

[58] Field of Search ..... 381/29–40, 381/49; 364/513.5

[56] References Cited

U.S. PATENT DOCUMENTS

| | | | |
|---|---|---|---|
| 3,624,302 | 11/1971 | Atal | 364/513.5 |
| 3,740,476 | 6/1973 | Atal | 381/49 |
| 4,130,729 | 12/1978 | Gagnon | 381/30 |
| 4,133,976 | 1/1979 | Atal et al. | 364/513.5 X |
| 4,140,876 | 2/1979 | Gagnon | 381/33 |
| 4,184,049 | 1/1980 | Crochier et al. | 381/37 |

*Primary Examiner*—E. S. Matt Kemeny
*Attorney, Agent, or Firm*—Jack S. Cubert

[57] ABSTRACT

An improved speech analysis and synthesis system wherein LPC parameters and a modified residual signal for excitation is transmitted: the excitation signal is the cross correlation of the residual signal and the LPC-recreated original signal.

43 Claims, 7 Drawing Figures

CLOCK SIGNAL GEN
ST
SC
FC
NETWORK
MULTIPLEXER
DELAY
CODER
ECS
EC
RESIDUAL SIGNAL GENERATOR
DELAY
LPC COMPUTER
AD CONVERTER
FILTER & SAMPLER
EXCITATION SIGNAL GENERATOR
CORRELATION SIGNAL GENERATOR
PREDICTIVE FILTER
PREDICTIVE FILTER
LPF
D/A CONVERTER
SPEECH SYNTHESIZER
DEC
DEMULTIPLEXER

ST
FC
CONTROLLER
215
PREDICTIVE FILTER SUBROUTINE ROM
201
EXCITATION PROCESSING SUBROUTINE
205
STORE
218
$a_k$
$d_k$
210
CONTROLLER INTERFACE
220
CENTRAL PROCESSOR
240
ARITHMETIC PROCESSOR
250
225
DATA MEMORY RAM
230
INPUT OUTPUT INTERFACE
260
$\beta_i$
$m_i$ START
303
WAIT FOR FRAME SIGNAL
305
GENERATE & STORE IMPULSE RESPONSE SIGNAL $h_k$ (k=0,1,2,···K)
307
INITIALIZE EXCITATION SIGNAL COUNT i=1, q=1
309
STORE $C_{iq}=\sum_{n=q}^{N} y_n h_{n-q} - \sum_{n=q}^{N} \hat{y}_{n,i-1} h_{n-q}$
311
q=q+1
313
q>Q
NO
YES
315
q=1
317
q=0
$C_{iq^*}=0$
319
$|C_{iq}|>|C_{iq^*}|$
NO
YES
321
$q^*=q$
$C_{iq^*}=C_{iq}$
323
q=q+1
325
q>Q
NO
YES
327
$m_i=q^*$
$\beta_i=C_{iq^*}/\sum_{k=0}^{K} h_k^2$
328
OUTPUT $\beta_i, m_i$ TO PREDICTIVE FILTER 123
329
i=i+1
331
i>I
YES
NO
333
q=1

DIGITAL SPEECH CODER

Matter enclosed in heavy brackets [ ] appears in the original patent but forms no part of this reissue specification; matter printed in italics indicates the additions made by reissue.

Our invention relates to speech processing and more particularly to digital speech coding arrangements.

Digital speech communication systems including voice storage and voice response facilities utilize signal compression to reduce the bit rate needed for storage and/or transmission. As is well known in the art, a speech pattern contains redundancies that are not essential to its apparent quality. Removal of redundant components of the speech pattern significantly lowers the number of digital codes required to construct a replica of the speech. The subjective quality of the speech replica, however, is dependent on the compression and coding techniques.

One well known digital speech coding system such as disclosed in U.S. Pat. No. 3,624,302 issued Nov. 30, 1971 includes linear prediction analysis of an input speech signal. The speech signal is partitioned into successive intervals and a set of parameters representative of the interval speech is generated. The parameter set includes linear prediction coefficient signals representative of the spectral envelope of the speech in the interval, and pitch and voicing signals corresponding to the speech excitation. These parameter signals may be encoded at a much lower bit rate than the speech signal waveform itself. A replica of the input speech signal is formed from the parameter signal codes by synthesis. The synthesizer arrangement generally comprises a model of the vocal tract in which the excitation pulses are modified by the spectral envelope representative prediction coefficients in an all pole predictive filter.

The foregoing pitch excited linear predictive coding is very efficient. The produced speech replica, however, exhibits a synthetic quality that is often difficult to understand. In general, the low speech quality results from the lack of correspondence between the speech pattern and the linear prediction model used. Errors in the pitch code or errors in determining whether a speech interval is voiced or unvoiced cause the speech replica to sound disturbed or unnatural. Similar problems are also evident in formant coding of speech. Alternative coding arrangements in which the speech excitation is obtained from the residual after prediction, e.g., ADPCM or APC, provide a marked improvement because the excitation is not dependent upon an inexact model. The excitation bit rate of these systems, however, is at least an order of magnitude higher than the linear predictive model. Attempts to lower the excitation bit rate in the residual type systems have generally resulted in a substantial loss in quality. It is an object of the invention to provide improved speech coding of high quality at lower bit rates than residual coding schemes.

BRIEF SUMMARY OF THE INVENTION

We have found that the foregoing residual encoding problems may be solved by forming a pattern predictive of a pattern (e.g. speech pattern) to be encoded and comparing the pattern to be encoded with the predictive pattern on a frame by frame basis. The differences between the pattern to be encoded and the predictive pattern over each frame are utilized to form a coded signal of a prescribed format which coded signal modifies the predictive pattern to minimize the frame differences. The bit rate of the prescribed format coded signal is selected so that the modified predictive pattern approximates the speech pattern to a desired level consistent with coding requirements.

The invention is directed to a sequential pattern processing arrangement in which the sequential pattern is partitioned into successive time intervals. In each time interval, a set of signals representative of the interval sequential pattern and a signal representative of the differences between the interval sequential pattern and the interval representative signal set are generated. A first signal corresponding to the interval pattern is formed responsive to said interval pattern representative signals and said interval differences representative signal and a second interval corresponding signal is generated responsive to said interval pattern representative signals. A signal corresponding to the differences between the first and second interval corresponding signals is formed and a third signal is produced responsive to said interval differences corresponding signal that alters the second signal to reduce the differences between said first and second interval corresponding signals.

According to one aspect of the invention, a speech pattern is partitioned into successive time intervals. In each interval, a set of signals representative of the speech pattern in each time interval and a signal representative of the differences between said interval speech pattern and the interval speech pattern representative signal set are generated. A first signal corresponding to the interval speech pattern is formed responsive to said interval speech representative signals and differences representative signal and a second interval corresponding signal is generated responsive to the interval speech pattern representative signals. A signal corresponding to the differences between the first and second interval representative signals is formed and a third signal is produced responsive to the interval differences corresponding signal that alters said second interval corresponding signal to reduce the differences corresponding signal.

According to another aspect of the invention, the third signal is utilized to construct a replica of the interval pattern.

In an embodiment of the invention, a set of predictive parameter signals is generated for each time frame from a speech signal. A prediction residual signal is formed responsive to the time frame speech signal and the time frame predictive parameters. The prediction residual signal is passed through a first predictive filter to produce a first speech representative signal for the time frame. An second speech representative signal is generated for the time frame in a second predictive filter from the frame prediction parameters. Responsive to the first speech representative and second speech representative signals of the time frame, a coded excitation signal is formed and applied to the second predictive filter to minimize the perceptually weighted mean squared difference between the frame first and second speech representative signals. The coded excitation signal and the predictive parameter signals are utilized to construct a replica of the time frame speech pattern.

DETAILED DESCRIPTION

Figure 1:
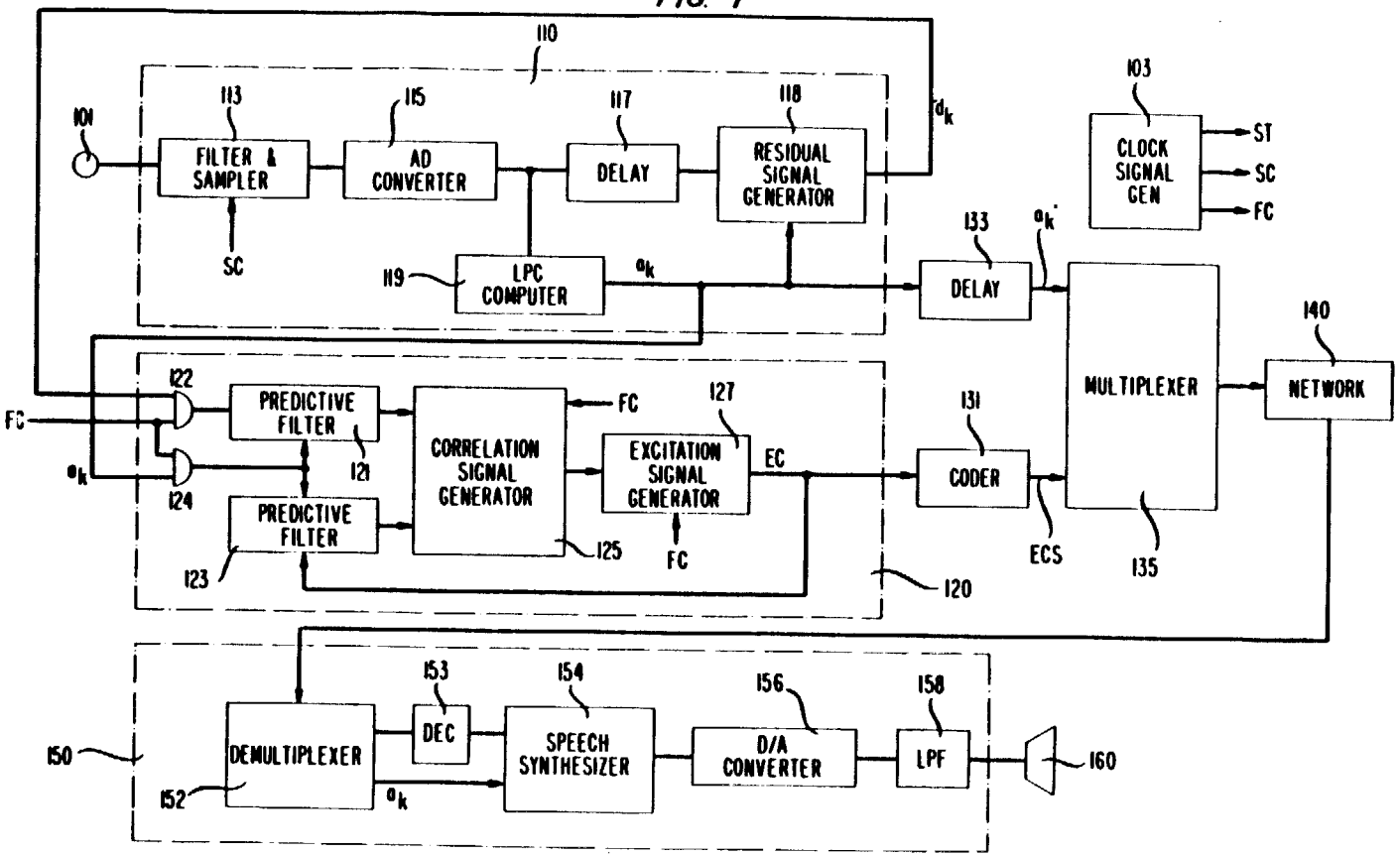
FIG. 1 depicts a block diagram of a speech processor circuit illustrative of the invention.

FIG. 1 shows a general block diagram of a speech processor illustrative of the invention. In FIG. 1, a speech pattern such as a spoken message is received by microphone transducer 101. The corresponding analog speech signal therefrom is bandlimited and converted into a sequence of pulse samples in filter and sampler circuit 113 of prediction analyzer 110. The filtering may be arranged to remove frequency components of the speech signal above 4.0 KHz and the sampling may be at an 8.0 KHz rate as is well known in the art. The timing of the samples is controlled by sample clock CL from clock generator 103. Each sample from circuit 113 is transformed into an amplitude representative digital code in analog-to-digital converter 115.

The sequence of speech samples is supplied to predictive parameter computer 119 which is operative, as is well known in the art, to partition the speech signals into 10 to 20 ms intervals and to generate a set of linear prediction coefficient signals $a_k, k=1,2,\ldots,p$ representative of the predicted short time spectrum of the $N>>p$ speech samples of each interval. The speech samples from A/D converter 115 are delayed in delay 117 to allow time for the formation of signals $a_k$. The delayed samples are supplied to the input of prediction residual generator 118. The prediction residual generator, as is well known in the art, is responsive to the delayed speech samples and the prediction parameters $a_k$ to form a signal corresponding to the difference therebetween. The formation of the predictive parameters and the prediction residual signal for each frame shown in predictive analyzer 110 may be performed according to the arrangement disclosed in U.S. Pat. No. 3,740,476 issued to B. S. Atal June 19, 1973 and assigned to the same assignee or in other arrangements well known in the art.

Figure 7:
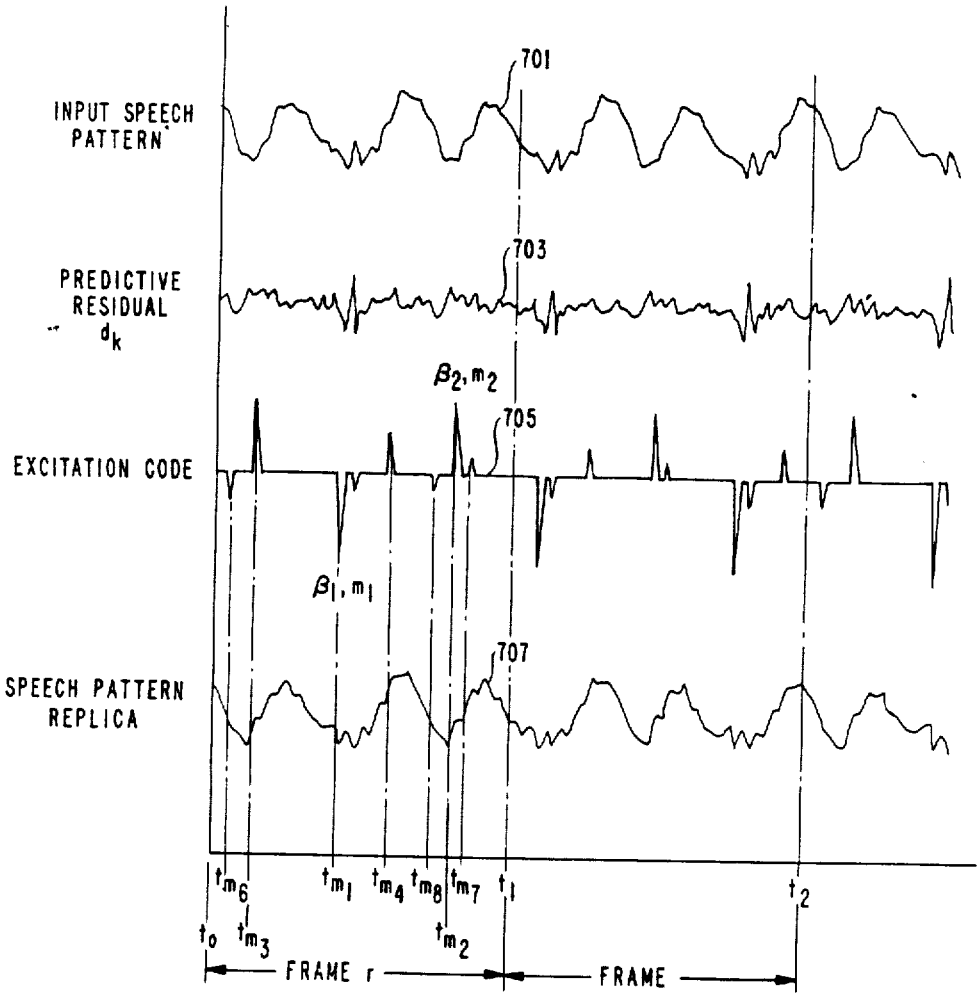
FIG. 7 shows waveforms illustrating the speech processing of the invention.

While the predictive parameter signals $a_k$ form an efficient representation of the short time speech spectrum, the residual signal generally varies widely from interval to interval and exhibits a high bit rate that is unsuitable for many applications. In the pitch excited vocoder, only the peaks of the residual are transmitted as pitch pulse codes. The resulting quality, however, is generally poor. Waveform 701 of FIG. 7 illustrates a typical speech pattern over two time frames. Waveform 703 shows the predictive residual signal derived from the pattern of waveform 701 and the predictive parameters of the frames. As is readily seen, waveform 703 is relatively complex so that encoding pitch pulses corresponding to peaks therein does not provide an adequate approximation of the predictive residual. In accordance with the invention, excitation code processor 120 receives the residual signal $d_k$ and the prediction parameters $a_k$ of the frame and generates an interval excitation code which has a predetermined number of bit positions. The resulting excitation code shown in waveform 705 exhibits a relatively low bit rate that is constant. A replica of the speech pattern of waveform 701 constructed from the excitation code and the prediction parameters of the frames is shown in waveform 707. As seen by a comparison of waveforms 701 and 707, higher quality speech characteristic of adaptive predictive coding is obtained at much lower bit rates.

The prediction residual signal $d_k$ and the predictive parameter signals $a_k$ for each successive frame are applied from circuit 110 to excitation signal forming circuit 120 at the beginning of the succeeding frame. Circuit 120 is operative to produce a multielement frame excitation code EC having a predetermined number of bit positions for each frame. Each excitation code corresponds to a sequence of $1 \leqq i \leqq I$ pulses representative of the excitation function of the frame. The amplitude $\beta_i$ and location $m_i$ of each pulse within the frame is determined in the excitation signal forming circuit so as to permit construction of a replica of the frame speech signal from the excitation signal and the predictive parameter signals of the frame. The $\beta_i$ and $m_i$ signals are encoded in coder 131 and multiplexed with the prediction parameter signals of the frame in multiplexer 135 to provide a digital signal corresponding to the frame speech pattern.

In excitation signal forming circuit 120, the predictive residual signal $d_k$ and the predictive parameter signals $a_k$ of a frame are supplied to filter 121 via gates 122 and 124, respectively. At the beginning of each frame, frame clock signal FC opens gates 122 and 124 whereby the $d_k$ signals are supplied to filter 121 and the $a_k$ signals are applied to filters 121 and 123. Filter 121 is adapted to modify signal $d_k$ so that the quantizing spectrum of the error signal is concentrated in the formant regions thereof. As disclosed in U.S. Pat. No. 4,133,976 issued to B. S. Atal et al, Jan. 9, 1979 and assigned to the same assignee, this filter arrangement is effective to mask the error in the high signal energy portions of the spectrum.

The transfer function of filter 121 is expressed in z transform notation as $$H(z) = \frac{1}{1 - B(z)} \tag{1}$$

where B(z) is controlled by the frame predictive parameters $a_k$.

Predictive filter 123 receives the frame predictive parameter signals from computer 119 and an artificial excitation signal EC from excitation signal processor 127. Filter 123 has the transfer function of Equation 1. Filter 121 forms a weighted frame speech signal y responsive to the predictive residual $d_k$ while filter 123 generates a weighted artificial speech signal $\hat{y}$ responsive to the excitation signal from signal processor 127. Signals y and $\hat{y}$ are correlated in correlation processor 125 which generates a signal E corresponding to the weighted difference therebetween. Signal E is applied to signal processor 127 to adjust the excitation signal EC so that the differences between the weighted speech representative signal from filter 121 and the weighted artificial speech representative signal from filter 123 are reduced.

The excitation signal is a sequence of $1 \leq i \leq I$ pulses. Each pulse has an amplitude $\beta_i$ and a location $m_i$. Processor 127 is adapted to successively form the $\beta_i$, $m_i$ signals which reduce the differences between the weighted frame speech representative signal from filter 121 and the weighted frame artificial speech representative signal from filter 123. The weighted frame speech representative signal may be expressed as:

$$y_n = \sum_{k=n-k}^{n} d_k h_{n-k} \quad 1 \leq n \leq N \tag{2}$$

and the weighted artificial speech representative signal of the frame may be expressed as $$\hat{y}_n = \sum_{j=1}^{i} \beta_j h_{n-m_j} \quad 1 \leq n \leq N \tag{3}$$

where $h_n$ is the impulse response of filter 121 or filter 123.

The excitation signal formed in circuit 120 is a coded signal having elements $\beta_i$, $m_i$, $i=1,2,\ldots,I$. Each element represents a pulse in the time frame. $\beta_i$ is the amplitude of the pulse and $m_i$ is the location of the pulse in the frame. Correlation signal generator circuit 125 is operative to successively generate a correlation signal for each element. Each element may be located at time $1 \leq q \leq Q$ in the time frame. Consequently, the correlation processor circuit forms Q possible candidates for element i in accordance with Equation 4:

$$C_{iq} = \sum_{n=q}^{N} Y_n h_{n-q} - \sum_{n=q}^{N} \hat{y}_{n,i-1} h_{n-q} \tag{4}$$

where $$\hat{y}_{n,i-1} = \sum_{j=1}^{i-1} \beta_j h_{n-m_j} \tag{5}$$

Excitation signal generator 127 receives the $C_{iq}$ signals from the correlation signal generator circuit, selects the $C_{iq}$ signal having the maximum absolute value and forms the $i_{th}$ element of the coded signal $$\beta_i = C_{iq^*} / \sum_{k=0}^{K} h_k^2 \tag{6}$$

$$m_i = q^*$$

where $q^*$ is the location of the correlation signal having the maximum absolute value. The index i is incremented to $i+1$ and signal $\hat{y}_n$ at the output of predictive filter 123 is modified. The process in accordance with Equations 4, 5 and 6 is repeated to form element $\beta_{i+1}$, $m_{i+1}$. After the formation of element $\beta_I$, $m_I$, the signal having elements $\beta_1 m_1, \beta_2 m_2, \ldots, \beta_I m_I$ is transferred to coder 131. As is well known in the art, coder 131 is operative to quantize the $\beta_i m_i$ elements and to form a coded signal suitable for transmission to network 140.

Each of filters 121 and 123 in FIG. 1 may comprise a transversal filter of the type described in aforementioned U.S. Pat. No. 4,133,976. Each of processors 125 and 127 may comprise one of the processor arrangements well known in the art adapted to perform the processing required by Equations 4 and 6 such as the C.S.P., Inc. Macro Arithmetic Processor System 100 or other processor arrangements well known in the art. Processor 125 includes a read-only memory which permanently stores programmed instructions to control the $C_{iq}$ signal formation in accordance with Equation 4 and processor 127 includes a read-only memory which permanently stores programmed instructions to select the $B_i$, $m_i$ signal elements according to Equation 6 as is well known in the art. The program instructions in processor 125 are set forth in FORTRAN language form in Appendix A and the program instructions in processor 127 are listed in FORTRAN language form in Appendix B.

Figure 3:
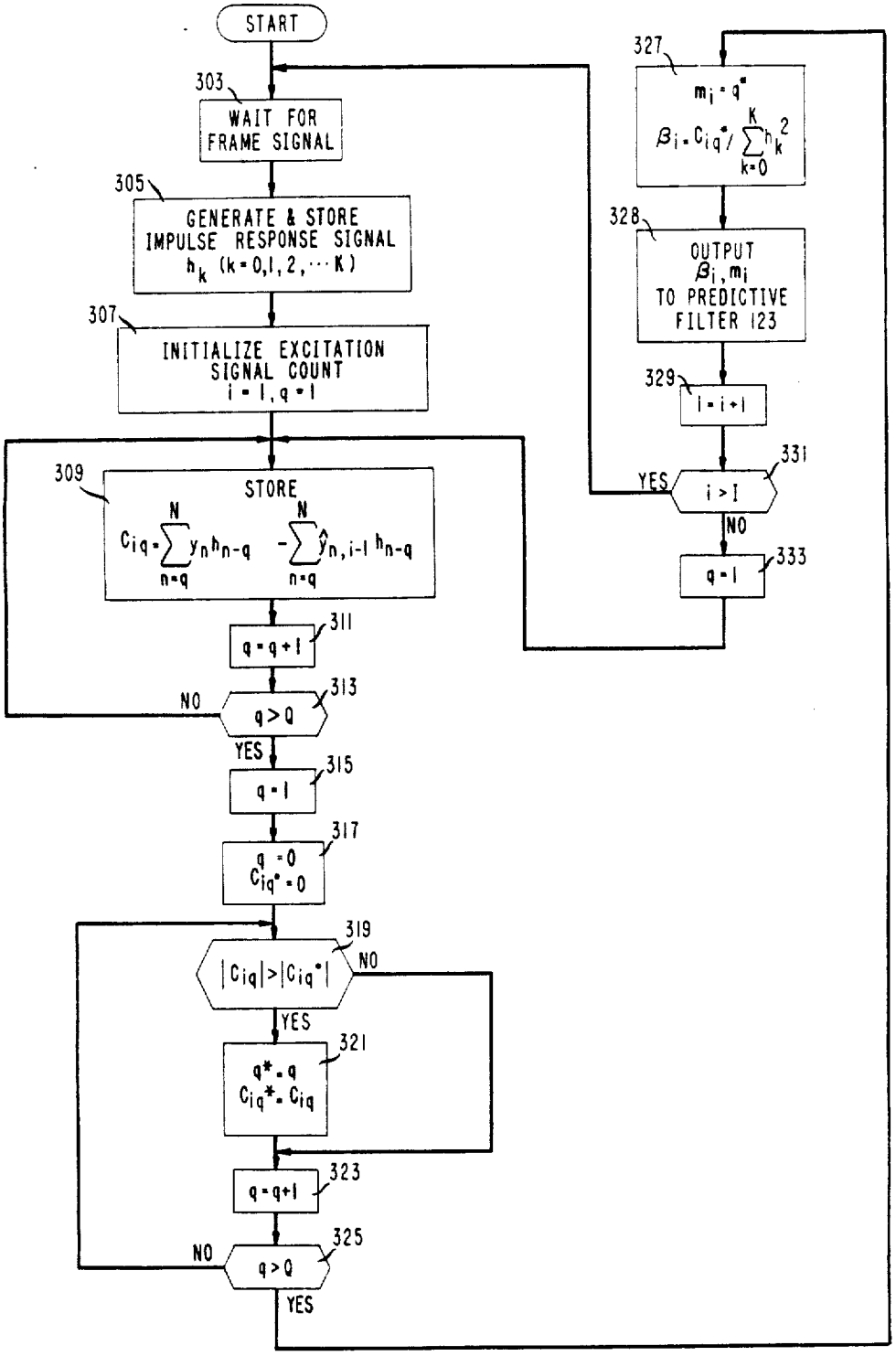
FIG. 3 shows a flow chart that illustrates the operation of the excitation signal forming circuit of FIG. 1.

FIG. 3 depicts a flow chart showing the operation of processors 125 and 127 for each time frame. Referring to FIG. 3, the $h_k$ impulse response signals are generated in box 305 responsive to the frame predictive parameters for the transfer function of Equation 1. This occurs after receipt of the FC signal from clock 103 in FIG. 1 as per wait box 303. The element index i and the excitation pulse location index q are initially set to 1 in box 307. Upon receipt of signals $y_n$ and $\hat{y}_{n,i-1}$ from predictive filters 121 and 123, signal $C_{iq}$ is formed as per box 309. The location index q is incremented in box 311 and the formation of the next location $C_{iq}$ signal is initiated.

After the $C_{iQ}$ signal is formed for excitation signal element i in processor 125, processor 127 is activated. The q index in processor 127 is initially set to 1 in box 315 and the i index as well as the $C_{iq}$ signals formed in processor 125 are transferred to processor 127. Signal $C_{iq^*}$ which represents the $C_{iq}$ signal having the maximum absolute value and its location $q^*$ are set to zero in box 317. The absolute values of the $C_{iq}$ signals are compared to signal $C_{iq^*}$ and the maximum of these absolute values is stored as signal $C_{iq^*}$ in the loop including boxes 319, 321, 323, and 325.

After the $C_{iQ}$ signal from processor 125 has been processed, box 327 is entered from box 325. The excitation code element location $m_i$ is set to $q^*$ and the magnitude of the excitation code element $\beta_i$ is generated in accordance with Equation 6. The $\beta_i m_i$ element is output to predictive filter 123 as per box 328 and index i is incremented as per box 329. Upon formulation of the $\beta_I m_I$ element of the frame, wait box 303 is reentered from decision box 331. Processors 125 and 127 are then placed in wait states until the FC frame clock pulse of the next frame.

The excitation code in processor 127 is also supplied to coder 131. The coder is operative to transform the excitation code from processor 127 into a form suitable for use in network 140. The prediction parameter signals $a_k$ for the frame are supplied to an input of multiplexer 135 via delay 133 as prediction signals $a'_k$. The excitation coded signal ECS from coder 131 is applied to the other input of the multiplexer. The multiplexed excitation and predictive parameter codes for the frame are then sent to network 140.

Network 140 may be a communication system, the message store of a voice storage arrangement, or apparatus adapted to store a complete message or vocabulary of prescribed message units, e.g., words, phonemes, etc., for use in speech synthesizers. Whatever the message unit, the resulting sequence of frame codes from circuit 120 are forwarded via network 140 to speech synthesizer 150. The synthesizer, in turn, utilizes the frame excitation codes from circuit 120 as well as the frame predictive parameter codes to construct a replica of the speech pattern.

Demultiplexer 152 in synthesizer 150 separates the excitation code EC of a frame from the prediction parameters $a_k$ thereof. The excitation code, after being decoded into an excitation pulse sequence in decoder 153, is applied to the excitation input of speech synthesizer filter 154. The $a_k$ codes are supplied to the parameter inputs of filter 154. Filter 154 is operative in response to the excitation and predictive parameter signals to form a coded replica of the frame speech signal as is well known in the art. D/A converter 156 is adapted to transform the coded replica into an analog signal which is passed through low-pass filter 158 and transformed into a speech pattern by transducer 160.

An alternative arrangement to perform the excitation code formation operations to circuit 120 may be based on the weighted means squared error between signals $y_n$ and $\hat{y}_n$. This weighted mean squared error upon forming $\beta_i$ and $m_i$ for the $i^{th}$ excitation signal pulse is $$E_i = \sum_{n=1}^{N} \left( y_n - \sum_{j=1}^{i} \beta_j h_{n-mj} \right)^2 \tag{7}$$

where $h_n$ is the $n^{th}$ sample of the impulse response of H(z), $m_j$ is the location of the $j^{th}$ pulse in the excitation code signal, and $\beta_j$ is the magnitude of the $j^{th}$ pulse.

The pulse locations and amplitudes are generated sequentially. The $i^{th}$ element of the excitation is determined by minimizing $E_i$ in Equation 7. Equation 7 may be rewritten as $$E_i = \sum_{n=1}^{N} \left[ \left( y_n - \sum_{j=1}^{i-1} \beta_j h_{n-mj} \right)^2 + \beta_1^2 h_{n-mi}^2 + -2\beta_i \left( y_n h_{n-mi} - \sum_{j=1}^{i-1} \beta_j h_{n-mj} h_{n-mi} \right) \right] \tag{8}$$

so that the known excitation code elements preceding $\beta_i, m_i$ appear only in the first term.

As is well known, the value of $\beta_i$ which minimizes $E_i$ can be determined by differentiating Equation 8 with respect to $\beta_i$ and setting $$\frac{\partial E_i}{\partial \beta_i} = 0 \tag{9}$$

Consequently, the optimum value of $\beta_i$ is $$= \frac{\sum_{k=m_i-K}^{m_i+K} d_k \phi|k - m_i| - \sum_{j=1}^{i-1} \beta_j \phi|m_j - m_i|}{\phi_0} \tag{10}$$

where $$\phi_k = \sum_{n=k}^{K} h_n h_{n-k} \; 0 \leq k \leq K \tag{11}$$

are the autocorrelation coefficients of the predictive filter impulse response signal $h_k$.

$\beta_i$ in Equation 10 is a function of the pulse location and is determined for each possible value thereof. The maximum of the $|\beta_i|$ values over the possible pulse locations is then selected. After $\beta_i$ and $m_i$ values are obtained, $\beta_{i+1}$ $m_{i+1}$ values are generated by solving Equation 10 in similar fashion. The first term of Equation 10, i.e., $$\sum_{k=m_i-K}^{m_i+K} d_k \phi_{k-mi}$$

corresponds to the speech representative signal of the frame at the output of predictive filter 121. The second term of Equation 10, i.e., $$\sum_{j=1}^{i-1} \beta_j \phi_{mj-mi}$$

corresponds to the artificial speech representative signal of the frame at the output of predictive filter 123. $\beta_i$ is the amplitude of an excitation pulse at location $m_i$ which minimizes the difference between the first and second terms.

Figure 2:
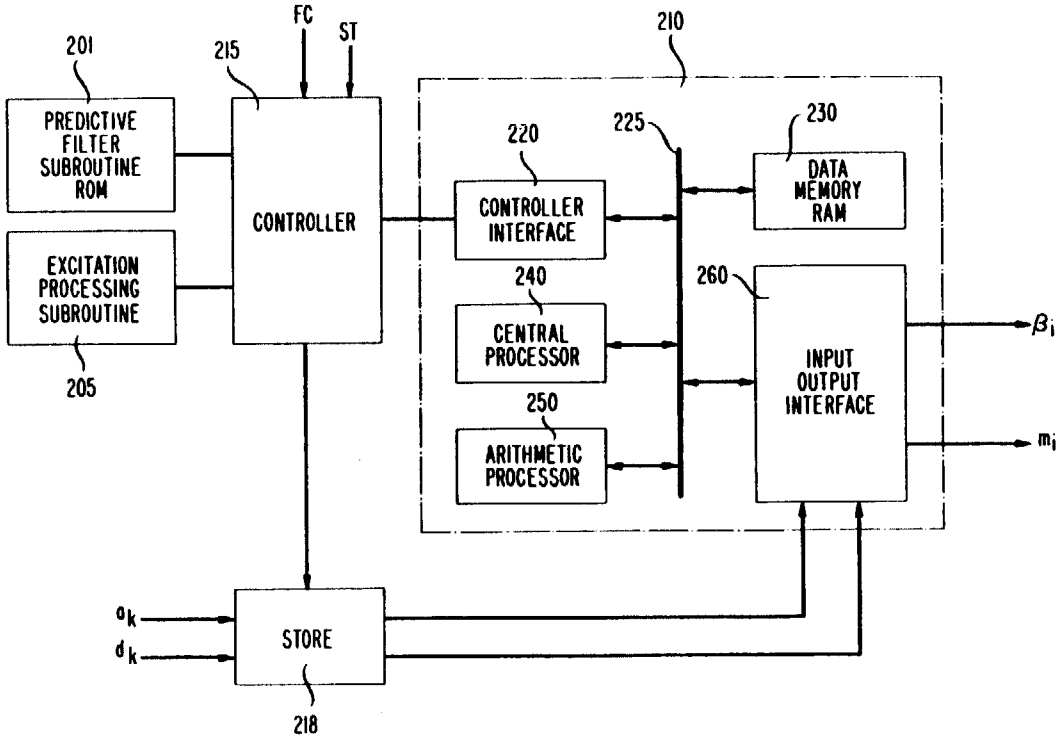
FIG. 2 depicts a block diagram of an excitation signal forming processor that may be used in the circuit of FIG. 1.

The data processing circuit depicted in FIG. 2 provides an alternative arrangement to excitation signal forming circuit 120 of FIG. 1. The circuit of FIG. 2 yields the excitation code for each frame of the speech pattern in response to the frame prediction residual signal $d_k$ and the frame prediction parameter signals $a_k$ in accordance with Equation 10 and may comprise the previously mentioned C.S.P., Inc. Macro Arithmetic Processor System 100 or other processor arrangements well known in the art.

Referring to FIG. 2, processor 210 receives the predictive parameter signals $a_k$ and the prediction residual signals $d_n$ of each successive frame of the speech pattern from circuit 110 via store 218. The processor is operative to form the excitation code signal elements $\beta_1$ $m_1$, $\beta_2$, $m_2$, . . . , $\beta_I$, $m_I$ under control of permanently stored instructions in predictive filter subroutine read-only memory 201 and excitation processing subroutine read-only memory 205. The predictive filter subroutine of ROM 201 is set forth in Appendix C and the excitation processing subroutine in ROM 205 is set forth in Appendix D.

Processor 210 comprises common bus 225, data memory 230, central processor 240, arithmetic processor 250, controller interface 220 and input-output interface 260. As is well known in the art, central processor 240 is adapted to control the sequence of operations of the other units of processor 210 responsive to coded instructions from controller 215. Arithmetic processor 250 is adapted to perform the arithmetic processing on coded signals from data memory 230 responsive to control signals from central processor 240. Data memory 230 stores signals as directed by central processor 240 and provides such signals to arithmetic processor 250 and input-output interface 260. Controller interface 220 provides a communication link for the program instructions in ROM 201 and ROM 205 to central processor 240 via controller 215, and input-output interface 260 permits the $d_k$ and $a_k$ signal to be supplied to data memory 230 and supplies output signals $\beta_i$ and $m_i$ from the data memory to coder 131 in FIG. 1.

Figure 4:
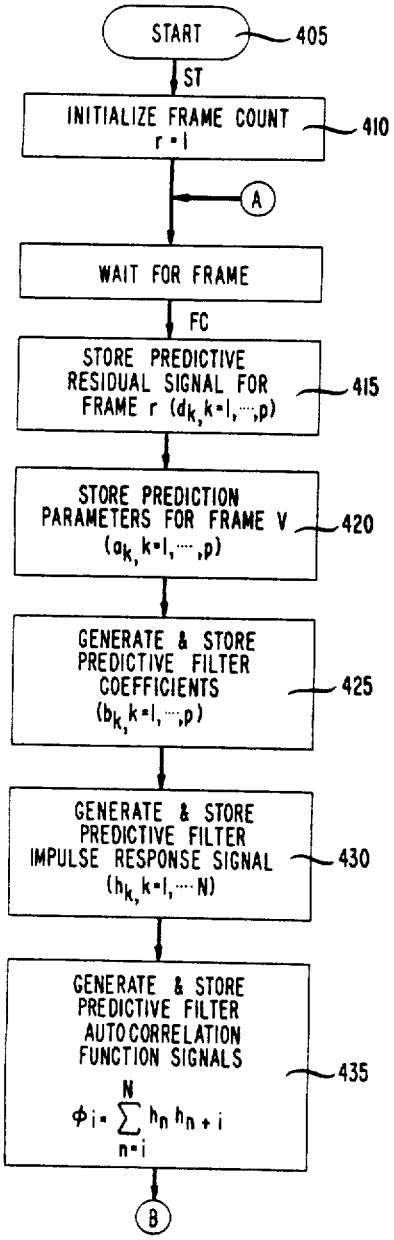
FIGS. 4 and 5 show flow charts that illustrate the operation of the circuit of FIG. 2.
Figure 5:
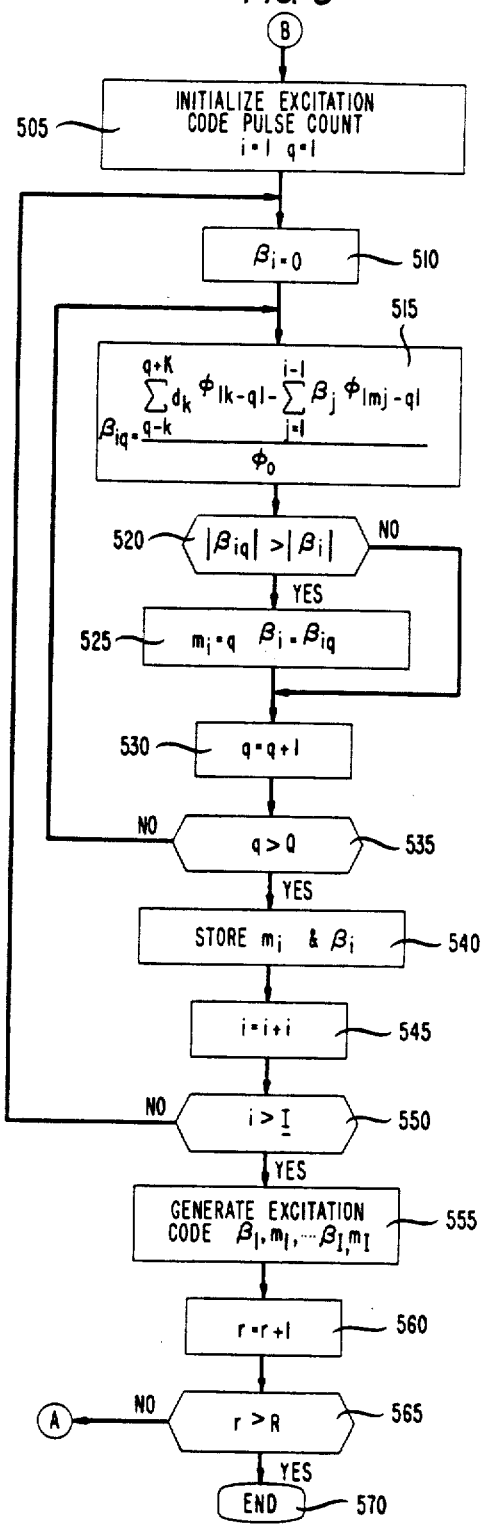
Figure 6:
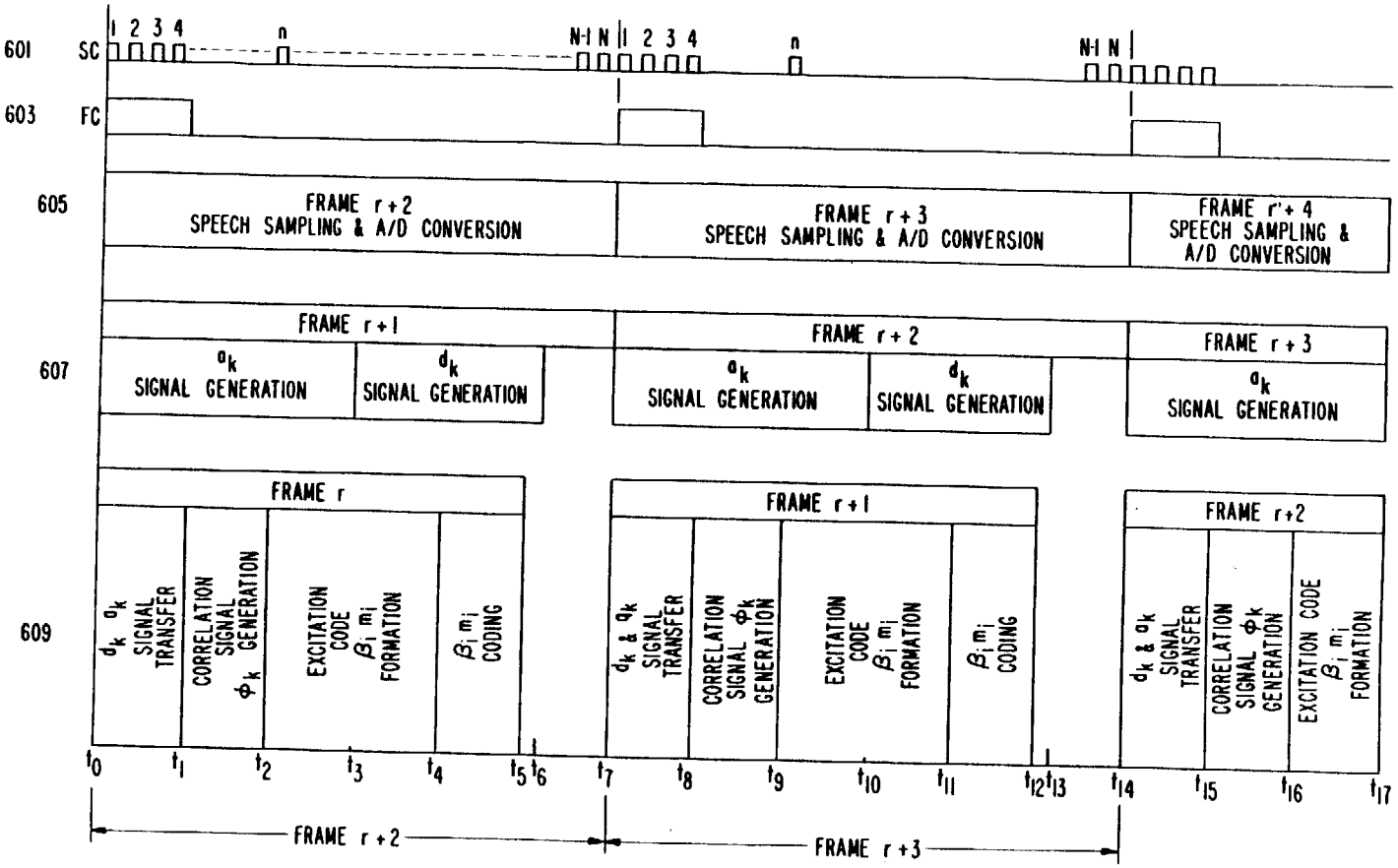
FIG. 6 shows a timing diagram that is illustrative of the operation of the excitation signal forming circuit of FIG. 1 and of FIG. 2.

The operation of the circuit of FIG. 2 is illustrated in the filter parameter processing flow chart of FIG. 4, the excitation code processing flow chart of FIG. 5, and the timing chart of FIG. 6. At the start of the speech signal, box 410 in FIG. 4 is entered via box 405 and the frame count r is set to the first frame by a single pulse ST from clock generator 103. FIG. 6 illustrates the operation of the circuit of FIGS. 1 and 2 for two successive frames. Between times $t_0$ and $t_7$ in the first frame, prediction analyzer 110 forms the speech pattern samples of frame r+2 as in waveform 605 under control of the sample clock pulses of waveform 601. Analyzer 110 generates the $a_k$ signals corresponding to frame r+1 between times $t_0$ and $t_3$ and forms predictive residual signal $d_k$ between times $t_3$ and $t_6$ as indicated in waveform 607. Signal FC (waveform 603) occurs between times $t_0$ and $t_1$. The signals $d_k$ from residual signal generator 118 previously stored in store 218 during the preceding frame are placed in data memory 230 via input-output interface 260 and common bus 225 under control of central processor 240. As indicated operation box 415 of FIG. 4, these operations are responsive to frame clock signal FC. The frame prediction parameter signals $a_k$ from prediction parameter computer 119 previously placed in store 218 during the preceding frame are also inserted in memory 230 as per operation box 420. These operations occur between times $t_0$ and $t_1$ on FIG. 6.

After insertion of the frame $d_k$ and $a_k$ signals into memory 230, box 425 is entered and the predictive filter coefficients $b_k$ corresponding to the transfer function of Equation 1:

$$b_k = \alpha^k a_k k = 1,2,\ldots,p \tag{12}$$

are generated in arithmetic processor 250 and placed in data memory 230. p is typically 16 and $\alpha$ is typically 0.85 for a sampling rate of 8 KHz. The predictive filter impulse response signals $h_k$ $$h_0 = 1$$
$$h_k = \sum_{i=1}^{min(k-1,p)} b_k h_{k-i} k = 1, 2, \ldots, K \tag{13}$$

are then generated in arithmetic processor 250 and stored in data memory 230. When the $h_k$ impulse response signal is stored, box 435 is entered and the predictive filter autocorrelation signals of Equation 11 are generated and stored.

At time $t_2$ in FIG. 6, controller 215 disconnects ROM 201 from interface 220 and connects excitation processing subroutine ROM 205 to the interface. The formation of the $\beta_i$, $m_i$ excitation pulse codes shown in the flow chart of FIG. 5 is then initiated. Between times $t_2$ and $t_4$ in FIG. 6, the excitation pulse sequence is formed. Excitation pulse index i is initially set to 1 and pulse location index q is set to 1 in box 505. $\beta_1$ is set to zero in box 510 and operation box 515 is entered to determine $\beta_{iq}=\beta_{11}$. $\beta_{11}$ is the optimum excitation pulse at location q=1 of the frame. The absolute value of $\beta_{11}$ is then compared to the previously stored $\beta_1$ in decision box 520. Since $\beta_1$ is initially zero, the $m_i$ code is set to q=1 and the $\beta_i$ code is set to $\beta_{11}$ in box 525.

Location index q is then incremented in box 530 and box 515 is entered via decision box 535 to generate signal $\beta_{12}$. The loop including boxes 515, 520, 525, 530 and 535 is iterated for all pulse location values $1 \leqq q \leqq Q$. After the $Q^{th}$ iteration, the first excitation pulse amplitude $\beta_1=\beta_{iq^*}$ and its location in the frame $m_1=q^*$ are stored in memory 230. In this manner, the first of the I excitation pulses is determined. Referring to waveform 705 in FIG. 7, frame r occurs between times $t_0$ and $t_1$. The excitation code for the frame consists of 8 pulses. The first pulse of amplitude $\beta_1$ and location $m_1$ occurs at time $t_{m1}$ in FIG. 7 as determined in the flow chart of FIG. 5 for index i=1.

Index i is incremented to the succeeding excitation pulse in box 545 and operation box 515 is entered via box 550 and box 510. Upon completion of each iteration of the loop between boxes 510 and 550, the excitation signal is modified to further reduce the signal of Equation 7. Upon completion of the second iteration, pulse $\beta_2$ $m_2$ (time $t_{m2}$ in waveform 705) is formed. Excitation pulses $\beta_3 m_3$ (time $t_{m3}$), $\beta_4 m_4$ (time $t_{m4}$), $\beta_5 m_5$ (time $t_{m5}$), $\beta_6 m_6$ (time $t_{m6}$), $\beta_7 m_7$ (time $t_{m7}$), and $\beta_8 m_8$ (time $t_{m8}$), are then successively formed as index i is incremented.

After the $I^{th}$ iteration (waveform 609 at $t_4$), box 555 is entered from decision box 550 and the current frame excitation code $\beta_1 m_1$, $\beta_2 m_2$, . . . , $\beta_{Im_I}$ is generated therein. The frame index is incremented in box 560 and the predictive filter operations of FIG. 4 for the next frame are started in box 415 at time $t_7$ in FIG. 6. Upon the occurrence of the FC clock signal for the next frame at $t_7$ in FIG. 6, the predictive parameter signals for frame r+3 are formed (waveform 605 between times $t_7$ and $t_{14}$), the $a_k$ and $d_k$ signals are generated for frame r+2 (waveform 607 between times $t_7$ and $t_{13}$), and the excitation code for frame r+1 is produced (waveform 609 between times $t_7$ and $t_{12}$).

The frame excitation code from the processor of FIG. 2 is supplied via input-output interface 260 to coder 131 in FIG. 1 as is well known in the art. Coder 131 is operative as previously mentioned in quantize and format the excitation code for application to network 140. The $a_k$ prediction parameter signals for the frame are applied to one input of multiplexer 135 through delay 133 so that the frame excitation code from coder 131 may be appropriately multiplexed therewith.

The invention has been described with reference to particular illustrative embodiments. It is apparent to those skilled in the art with various modifications may be made without departing from the scope and the spirit of the invention. For example, the embodiments described herein have utilized linear predictive parameters and a predictive residual. The linear predictive parameters may be replaced by formant parameters or other speech parameters well known in the art. The predictive filters are then arranged to be responsive to the speech parameters that are utilized and to the speech signal so that the excitation signal formed in circuit 120 of FIG. 1 is used in combination with the speech parameter signals to construct a replica of the speech pattern of the frame in accordance with the invention. The encoding arrangement of the invention may be extended to sequential patterns such as biological and geological patterns to obtain efficient representations thereof.

APPENDIX A

```
C     THIS SUBROUTINE IMPLEMENTS BOX NOS 125-FIG. 1
C      ++++++ CORRELATION SIGNAL GENERATOR ++++++

      COMMON Y(110),YHAT(110),H(15),CI(110),A(15),F(16),
     &BETA(12),M(12)
```

```
      INTEGER I,K,Q,QSTAR,QMAX
      DATA NLPC/16/,KMAX/15/,NMAX/110/,
     &QMAX/95/,ALPHA/0.85/,IMAX/12/
C++++  COMPUTE COEFFICIENTS FOR THE PREDICTIVE FILTER
      G=1
      DO101K=1,NLPC
      G=G*ALPHA
  101 F(K)=A(K)*G

C++++    BOX 305 FIG. 3
C++++    COMPUTE IMPULSE RESPONSE OF
C++++      PREDICTIVE FILTER H(Z)
C++++    H(0) IS STORED AS H(1) , H(1) IS
C++++      STORED AS H(2), AND SO ON
      H(1)=1
      DO102K=2,NLPC
      H(K)=0
      DO102I=1,K-1
  102 H(K)=H(K)+F(I)*H(K-I)

      DO103K=NLPC+1,KMAX
      H(K)=0
      DO103I=1,NLPC
  103 H(K)=H(K)+F(I)*H(K-I)

      SUMSQH=0
      DO104K=1,KMAX
  104 SUMSQH=SUMSQH+H(K)*H(K)

C++++  SET INITIAL EXCITATION SIGNAL COUNT - BOX 307
      I=1
      Q=1

  500 Q=1
  200 CONTINUE

C++++    COMPUTE CORRELATION SIGNAL - BOX 309
      DO201N=Q,NMAX
  201 CI(Q)=CI(Q)+(Y(N)-YHAT(N))*H(N-Q+1)
      Q=Q+1
      IF(Q.LE.QMAX)GOTO200

      CALL BOX127(I,SUMSQH)

      I=I+1
      IF(I.LE.IMAX)GOTO500
      RETURN
      END
```

APPENDIX B

```
C     THIS SUBROUTINE IMPLEMENTS BOX NOS 127 - FIG. 1
C      ++++++ EXCITATION SIGNAL GENERATOR  ++++++

      COMMON Y(110),YHAT(110),H(15),CI(110),A(16,F(16),
     &BETA(12),M(12)
```

```
      INTEGER I,K,Q,QSTAR,QMAX
      DATA NLPC/16/,KMAX/15/,NMAX/110/,QMAX/95/,
     &ALPHA/0.85/, IMAX/12/
C++++     FIND PEAK OF THE CORRELATION SIGNAL -
C++++       BOX 315-325
      Q=1
      QSTAR=0
      CIQSTAR=0

300   IF(ABS(CI(Q)).LT.ABS(CIQSTAR))GOTO301
      QSTAR=Q
      CIQSTAR=CI(Q)

301   Q=Q+1
      IF(Q.LE.QMAX)GOTO300

      M(I)=QSTAR
      BETA(I)=CIQSTAR/SUMSQH

      RETURN
      END
```

APPENDIX C

```
C     THIS SUBROUTINE IMPLEMENTS ROM 201 - FIG. 2
C      ++++++  PREDICTIVE FILTER ++++++

      COMMON D(110),H(15),BETAI(80),A(16),F(16),
     &PHI(15),BETA(12),M(12)
      INTEGER I,K,Q,QSTAR,QMAX
      DATA NLPC/16/,KMAX/15/,NMAX/110/,QMAX/80/,
     &ALPHA/0.85/, IMAX/12/

C++++     READ PREDICTIVE RESIDUAL SIGNAL - BOX 415
      CALL INPUT (D(29),80)

C++++     READ PREDICTION PARAMETERS - BOX 420
      CALL INPUT(A,16)

C++++     COMPUTE COEFFICIENTS FOR THE PREDICTIVE
C++++      FILTER - BOX 425
      G=1
      DO101K=1,NLPC
      G=G*ALPHA
  101 F(K)=A(K)*G

C++++     COMPUTE IMPULSE RESPONSE OF PREDICTIVE
C++++      FILTER H(Z)
C++++     H(0) IS STORED AS H(1) , H(1)
C++++      IS STORED AS H(2), AND SO ON
C++++     BOX 430
      H(1)=1
      DO102K=2,NLPC
      H(K)=0
      DO102I=1,K-1
  102 H(K)=H(K)+F(I)*H(K-I)
```

```
      DO103K=NLPC+1,KMAX
      H(K)=0
      DO103I=1,NLPC
  103 H(K)=H(K)+F(I)*H(K-I)
C++++   COMPUTE AUTOCORRELATION FUNCTION SIGNALS -
C++++    BOX 435
      DO104K=1,KMAX
      PHI(K)=0
      DO104N=K,KMAX
  104 PHI(K)=PHI(K)+H(N)*H(N+K-1)

      RETURN
      END
```

APPENDIX D

```
C       THIS SUBROUTINE IMPLEMENTS ROM 205 - FIG. 2
C          ++++++ EXCITATION PROCESSING ++++++

        COMMON D(110),H(15),BETAI(80),A(16),
       &PHI(15),BETA(12),M(12)
        INTEGER I,K,Q,QSTAR,QMAX
        DATA NLPC/16/,KMAX/15/,NMAX/110/,QMAX/80/,
       &ALPHA/0.85/, IMAX/12/

C++++  COMPUTE INITIAL BETAI SIGNAL (I=1)
C++++  TERM NO 1 EQUATION 10 AND BOX 515
       DO105Q=1,QMAX
       BETAI(Q)=0
       DO105N=Q,Q+2*KMAX-2
       K=N-KMAX+1
  105  BETAI(Q)=BETAI(Q)+D(N)*PHI(1+IABS(K-Q))

C++++   SET INITIAL EXCITATION SIGNAL COUNT - BOX 505
       I=1
       Q=1

  500  CONTINUE
       BETAMAX=0

  200  CONTINUE

C++++     COMPUTE BETAI SIGNAL - BOX 515
       IF(I.EQ.1)GOTO300
       DO201J=1,I-1
  201  BETAI(Q)=BETAI(Q)-BETA(J)*PHI(1+IABS(M(J)-Q))

C++++  FIND PEAK OF THE BETAI SIGNAL - BOX 520-525
  300  IF(ABS(BETAI(Q)).LT.BETAMAX)GOTO301

       M(I)=Q
       BETAMAX=ABS(BETAI(Q))
       BETA(I)=BETAI(Q)/PHI(I)

  301  Q=Q+1
       IF(Q.LE.QMAX)GOTO200
```

```
      I=I+1
      IF(I.LE.IMAX)GOTO500
CALL OUTPUT(BETA,IMAX)
CALL OUTPUT(M,IMAX)

DO5K=1,29
D(K)=D(K+80)

RETURN
END
```

What is claimed is:

1. A method for processing a sequential pattern comprising the steps of: partitioning said sequential pattern into successive time intervals; generating a set of signals representative of the sequential pattern of each time interval responsive to said time interval sequential pattern; generating a signal corresponding to the differences between said interval sequential pattern and the interval representative signal set responsive to said interval sequential pattern and said interval representative signals; forming a first signal corresponding to the interval pattern responsive to said interval pattern representative signals and said interval differences representative signal; generating a second interval corresponding signal responsive to said interval pattern representative signals; generating a signal corresponding to the differences between said first and second interval corresponding signals; producing a third signal responsive to said interval differences corresponding signal for altering said second signal to reduce the interval differences corresponding signal; and utilizing said third signal to construct a replica of said interval sequential pattern.

2. A method for processing a speech pattern comprising the steps of: partitioning the speech pattern into successive time intervals; generating a set of signals representative of said speech pattern of each time interval responsive to said interval speech pattern; generating a signal representative of the differences between said interval speech pattern and the interval speech pattern representative signal set responsive to said interval speech pattern and said interval speech pattern representative signals; forming a first signal corresponding to the interval speech pattern responsive to said interval speech pattern representative signals and the interval differences representative signal; forming a second interval corresponding signal responsive to the interval speech pattern representative signals; generating a signal corresponding to the differences between said first and second interval corresponding signals; and producing a third signal responsive to said interval differences corresponding signal for altering said second signal to reduce the interval differences corresponding signal.

3. A method for processing a speech pattern according to claim 2 wherein: said interval representative signal set generating step comprises generating a set of speech parameter signals representative of said interval speech pattern; said first interval corresponding signal forming step comprises generating said first interval corresponding signal responsive to said speech parameter signals and said differences representative signal; and said second interval corresponding signal forming step comprises generating said second interval corresponding signal responsive to said interval speech parameter signals.

4. A method for processing a speech pattern according to claim 3 wherein said speech parameter signal generating step comprises generating a set of signals representative of the interval speech spectrum.

5. A method for processing a speech pattern according to claim 4 wherein: said third signal producing step comprises generating a coded signal having at least one element responsive to the interval differences corresponding signal; and modifying said second interval corresponding signal responsive to said coded signal element.

6. A method for processing a speech pattern according to claim 5 wherein: said coded signal generating step comprises generating, for a predetermined number of times, a coded signal element responsive to said interval differences corresponding signal; and modifying said second interval corresponding signal responsive to said generated coded signal elements.

7. A method for processing a speech pattern according to claim 6 wherein: said differences corresponding signal generating step comprises generating a signal representative of the correlation between said first interval corresponding and second interval corresponding signals.

8. A method for processing a speech pattern according to claim 5 wherein said differences corresponding signal generating step comprises generating a signal representative of the mean squared difference between said first and second interval corresponding signals.

9. A method for processing a speech pattern according to claims 2, 3, or 4 further comprising the step of utilizing said third signal to construct a replica of said interval speech pattern.

10. A sequential pattern processor comprising means for partitioning a sequential pattern into successive time intervals; means responsive to each time interval sequential pattern for generating a set of signals representative of the sequential pattern of said time interval; means responsive to said interval sequential pattern and said interval representative signals for generating a signal representative of the differences between said interval sequential pattern and the interval representative signal set; means responsive to said interval pattern representative signals and said differences representative signal for forming a first signal corresponding to the interval pattern; means responsive to said interval pattern representative signals for generating a second interval corresponding signal; means for generating a signal corresponding to the differences between said first and second interval corresponding signals; and means responsive to said interval differences corresponding signal for producing a third signal for altering said second signal to reduce the interval differences corresponding signal; and means for utilizing said third signal to construct a replica of said interval sequential pattern.

11. A speech processor comprising means for partitioning a speech pattern into successive time intervals; means responsive to each interval speech pattern for generating a set of signals representative of the speech pattern of said time interval; means responsive to said interval speech pattern and said interval speech pattern representative signals for generating a signal representative of the differences between said interval speech pattern and the interval representative signal set; means responsive to said speech interval signals and said interval differences representative signal for forming a first signal corresponding to the interval speech pattern; means responsive to said interval speech pattern representative signals for forming a second interval corresponding signal; means for generating a signal corresponding to the differences between said first and second interval corresponding signals; and means responsive to said interval differences corresponding signal for producing a third signal for altering said second interval corresponding signal to reduce the interval differences corresponding signal.

12. A speech processor according to claim 11 wherein: said speech interval representative signal set generating means comprises means for generating a set of signals representative of prescribed speech parameters of said interval speech pattern; said first interval corresponding signal forming means comprises means responsive to said interval prescribed speech parameter signals and said differences representative signal for generating said first interval corresponding signal; said second interval corresponding signal forming means comprises means responsive to said interval prescribed speech parameter signals for generating the second interval corresponding signal.

13. A speech processor according to claim 12 wherein said prescribed speech parameter signal generating means comprises means for generating a set of signals representative of the interval speech pattern spectrum.

14. A speech processor according to claim 13 wherein: said third signal producing means comprises means responsive to said interval differences corresponding signal for generating a coded signal having at least one element; and means responsive to said coded signal elements for modifying said second interval corresponding signal.

15. A speech processor according to claim 14 wherein: said coded signal generating means comprises means operative N times to produce an N element coded signal including means responsive to said differences corresponding signal for generating coded signal elements; and means responsive to the generated coded signal elements for modifying said second interval corresponding signal.

16. A speech processor according to claim 15 wherein: said interval differences corresponding signal generating means comprises means for generating a signal representative of the correlation between said first and second interval corresponding signals.

17. A speech processor according to claim 15 wherein said interval differences corresponding signal generating means comprises means for generating a signal representative of the mean squared difference between said first and second interval corresponding signals.

18. A speech processor according to claims 11, 12, or 13 further comprising the step of utilizing said third signal to construct a replica of said interval speech pattern.

19. A method for encoding a speech pattern comprising the steps of: partitioning a speech pattern into successive time frames; generating for each frame a set of speech parameter signals responsive to the frame speech pattern; generating a signal representative of the differences between the frame speech pattern and said speech parameter signal set responsive to said frame speech pattern and said frame speech parameter signals; generating a first signal corresponding to the frame speech pattern responsive to said frame speech parameter signals and said differences representative signal; generating a second frame corresponding signal responsive to said frame speech parameter signals; generating a signal corresponding to the differences between said first and second interval corresponding signals; and producing a coded signal responsive to said interval differences corresponding signal for modifying said second interval corresponding signal to reduce said interval differences corresponding signal.

20. A method for encoding a speech signal according to claim 19 further comprising combining said produced coded signal and said speech parameter signals to form a coded signal representative of the frame speech pattern.

21. A method for encoding a speech signal according to claim 19 wherein said speech parameter signal set generation comprises generating a set of linear predictive parameter signals for the frame responsive to said frame speech pattern; and said differences representative signal generation comprises generating a predictive residual signal responsive to said frame linear prediction parameter signals and said frame speech pattern.

22. A method for encoding a speech signal according to claim 21 wherein said coded signal producing step comprises generating a coded signal having at least one element responsive to said differences corresponding signal; and modifying said frame second signal responsive to said coded signal elements.

23. A method for encoding a speech pattern according to claim 21 wherein said signal producing step comprises generating a multielement coded signal by successively generating a coded signal element responsive to said differences corresponding signal and modifying said second signal responsive to said coded signal elements.

24. Apparatus for encoding a speech pattern comprising means for partitioning a speech pattern into successive time frames; means responsive to the frame speech pattern for generating for each frame a set of speech parameter signals; means responsive to said frame speech parameter signals and said frame speech pattern for generating a signal representative of the differences between said frame speech pattern and said frame speech parameter signal set; means responsive to said frame speech parameter signals and said differences representative signal for generating a first signal corresponding to said frame speech pattern; means responsive to said frame speech parameter signals for generating a second frame corresponding signal; means for generating a signal corresponding to the differences between said first and second frame corresponding signals; and means responsive to said frame differences corresponding signal for producing a third signal to modify said second signal to reduce the frame differences corresponding signal.

25. Apparatus for encoding a speech pattern according to claim 24 further comprising means for combining said produced coded signal and said speech parameter signals to form a coded signal representative of the frame speech pattern.

26. Apparatus for encoding a speech pattern according to claim 24 wherein said speech parameter signal generating means comprises means responsive to said frame speech pattern for generating a set of linear predictive parameter signals for the frame; said differences representative signal generating means comprises means responsive to said frame linear prediction parameter signals and said frame speech pattern for generating a frame predictive residual signal; said first signal generating means comprises means responsive to said frame predictive parameter signals and said frame predictive residual signal for forming said first frame corresponding signal; and said second signal generating means comprises means responsive to said frame linear predictive parameter signals for forming said second frame corresponding signal.

27. Apparatus for encoding a speech pattern according to claim 26 wherein said coded signal producing means comprises means responsive to said difference corresponding signal for generating a coded signal having at least one element; and means responsive to said coded signal element for modifying said second signal.

28. Apparatus for encoding a speech pattern according to claim 26 wherein said coded signal producing means comprises means for generating a multielement coded signal including means operative successively for generating a coded signal element responsive to said differences corresponding signal and for modifying said second signal responsive to said coded signal elements.

29. A speech processor comprising means for partitioning a speech pattern into successive time frames; means responsive to the speech pattern of each frame for producing a set of predictive parameter signals and a predictive residual signal; means responsive to said frame predictive parameter and predictive residual signals for generating a first signal corresponding to the frame speech pattern; means responsive to said frame predictive parameter signals for generating a second frame corresponding signal; means responsive to said first and second frame corresponding signals for producing a signal corresponding to the differences between said first and second frame corresponding signals; means responsive to said frame differences corresponding signal for generating a coded excitation signal and for applying said coded excitation signal to said second signal generating means to reduce the differences corresponding signal.

30. A speech processor according to claim 29 further comprising means responsive to said frame coded excitation signal and said frame predictive parameter signals for constructing a replica of said frame speech pattern.

31. A speech processor according to claim 29 or claim 30 wherein said coded excitation signal generating means comprises means operative successively to form a multielement coded signal comprising means responsive to the differences corresponding signal for forming an element of said multielement code and for modifying said second signal responsive to said coded signal elements.

32. A method for processing a speech pattern according to claim 5, 6, 7, or 8 further comprising the step of utilizing said coded signal to construct a replica of said interval speech pattern.

33. A speech processor according to claim 14, 15, 16, or 17 further comprising means for utilizing said coded signal to construct a replica of said interval speech pattern.

34. A speech processor for producing a speech message comprising: means for receiving a sequence of speech message time interval signals, each speech interval signal including a plurality of spectral representative signals and an excitation representative signal for said time interval; means jointly responsive to said interval spectral representative signals and said interval excitation representative signal for generating a speech pattern corresponding to the speech message; said interval excitation speech signal being formed by the steps of: partitioning a speech message pattern into successive time intervals; generating a set of signals representative of said speech message pattern for each time interval responsive to said interval speech pattern; generating a signal representative of the differences between said interval speech pattern and said representative signal set responsive to said interval speech pattern and said interval respresentative signals; forming a first signal corresponding to the interval speech message pattern responsive to said speech message pattern interval representative signals and differences representative signal; forming a second interval corresponding signal responsive to said interval speech message pattern representative signals; generating a signal corresponding to the differences between said first and second interval corresponding signals; and producing a third signal responsive to said interval differences corresponding signal for altering said second interval corresponding signal to reduce the interval differences corresponding signal, said third signal being said interval excitation representative signal.

35. A speech processor according to claim 34 wherein said interval differences corresponding signal generating step comprises generating a signal representative of the correlation between said first interval corresponding signal and said second interval corresponding signal and said third signal producing step comprises forming a coded signal responsive to said correlation representative signal.

36. A speech processor according to claim 34 or 35 wherein said speech message interval spectral representative signals are time interval predictive parameter signals.

37. A method for producing a speech message comprising the steps of: receiving a sequence of speech message interval signals, each speech interval signal including a plurality of spectral representative signals and an excitation representative signal; and generating a speech pattern corresponding to the speech message jointly responsive to said interval spectral representative signals and said interval excitation representative signals; said interval excitation speech signal being formed by the steps of: partitioning a speech pattern into successive time intervals; generating a set of signals representative of the spectrum of said speech pattern for each time interval responsive to said interval speech pattern; generating a signal representative of the differences between said interval speech pattern and said interval speech pattern spectral representative signal set responsive to said interval speech pattern and said spectral representative signals; forming a first signal corresponding to the interval speech pattern responsive to said interval spectral representative signals and said differences representative signal; forming a second interval corresponding signal responsive to said speech pattern interval spectral representative signals; generating a signal corresponding to the differences between said first and second interval corresponding signals; and producing a third signal responsive to said interval differences corresponding signal for altering said second interval corresponding signal to reduce the interval differences corresponding signal said third signal being said interval excitation signal.

38. A method for producing a speech message according to claim 37 wherein said interval differences corresponding signal generating step comprises generating a signal representative of the correlation between said first signal and said second signal and said third signal producing step comprises forming a prescribed format signal responsive to said correlation representative signal.

39. A method for producing a speech message according to claim 37 or 38 wherein said speech interval spectral representative signals are speech interval predictive parameter signals.

*40. Apparatus for producing a speech message comprising:*

*means for receiving a sequence of speech message signals for the successive time intervals of the speech message, each time interval speech message signal including a set of coded spectral representative signals for the time interval portion of said speech message and a plurality of pulse amplitude and location coded signals representative of the differences between the time interval portion of the speech message and the time interval portion of the speech message formed from said spectral representative signals;*

*means for converting the plurality of pulse amplitude and location codes of said time interval into a signal representative of the excitation of the time interval portion of said speech message; and*

*means jointly responsive to said interval spectral representative signals and said interval excitation representative signal for generating a speech pattern corresponding to the speech message of said time interval.*

*41. Apparatus for producing a speech message according to claim 40 wherein said converting means comprises means responsive to said amplitude and location codes for forming a sequence of pulses within said time interval representative of the excitation of the speech message portion of said time interval.*

*42. A method for producing a speech message comprising the steps of:*

*receiving a sequence of speech message signals for the successive time interval portions of the speech message, each time interval speech message signal including a set of coded spectral representative signals for the time interval portion of said speech message and a plurality of pulse amplitude and location coded signals representative of the differences between the time interval portion of the speech message and the time interval portion of the speech message formed from said spectral representative signals;*

*converting the plurality of pulse amplitude and location codes of said time interval into a signal representative of the excitation of the time interval portion of said speech message; and*

*generating a speech pattern corresponding to the speech message of said time interval jointly responsive to said interval spectral representative signals and said interval excitation representative signal.*

*43. A method for producing a speech message according to claim 42 wherein said converting step comprises forming a sequence of pulses within said time interval representative of the excitation of the speech message portion of said time interval responsive to said amplitude and location codes.*

* * * * *